UNITED STATES PATENT OFFICE.

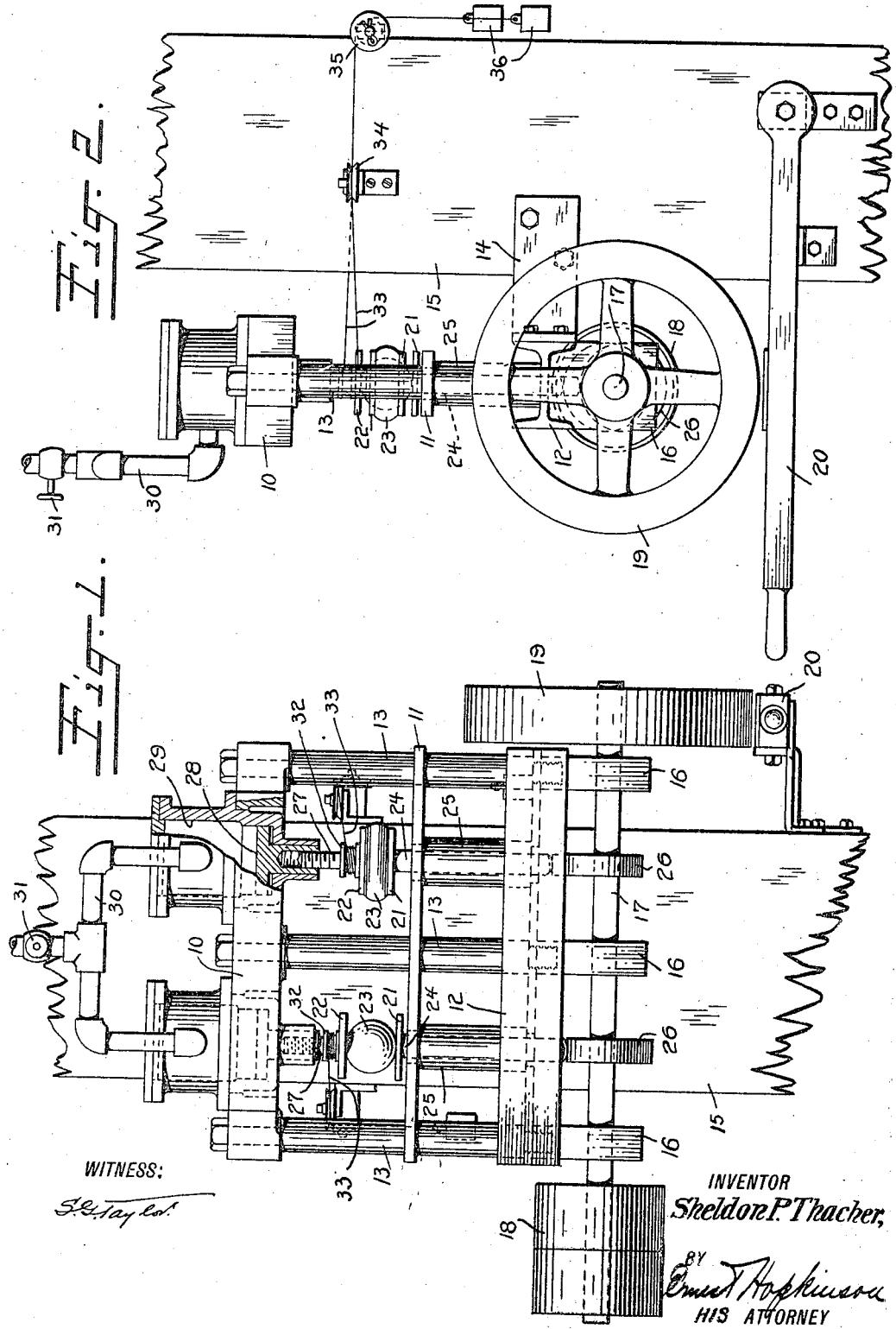

SHELDON P. THACHER, OF WEEHAWKEN, NEW JERSEY, ASSIGNOR TO REVERE RUBBER COMPANY, A CORPORATION OF RHODE ISLAND.

TESTING-MACHINE.

1,288,746.

Specification of Letters Patent.

Patented Dec. 24, 1918.

Application filed June 7, 1916. Serial No. 102,190.

*To all whom it may concern:*

Be it known that I, SHELDON P. THACHER, a citizen of the United States, residing at Weehawken, county of Hudson, and State of New Jersey, have invented certain new and useful Improvements in Testing-Machines, of which the following is a full, clear, and exact description.

This invention relates to machines for testing plastics, more particularly rubber compounds of that general type adapted for use in the manufacture of tires.

An object of the invention is to provide apparatus for testing the material under conditions approximating service conditions, and to attain this end employs means for alternately compressing and permitting expansion of the material, to cause it to take a permanent set under internal heat conditions, etc., approximately the same as produced in a tire in service.

The invention can be readily understood from the following description taken in connection with the accompanying drawing in which —

Figure 1 is a front elevation of the apparatus with a part broken away.

Fig. 2 is a side elevation of the parts shown in Fig. 1.

Referring now to the drawing in which like characters of reference designate similar parts, the apparatus is shown to comprise a frame including an upper bar 10, an intermediate bar 11, and a lower bar 12, all connected by tie-rods 13. The frame is supported upon a bracket 14 which is bolted or otherwise secured to a post 15, or other suitable support. The tie-rods 13, in the present embodiment, are equipped with bearings 16 in which is mounted a shaft 17 that is equipped at one end with a driving pulley 18 and at the other end with a balance wheel 19. A friction brake 20 is mounted to contact with the balance wheel to stop the machine after the power is thrown off.

There are two sets of testing devices shown in the present embodiment, and as each is a duplicate of the other, but one will be described. Each device comprises a pair of members 21 and 22 between which the material to be tested, preferably in the shape of a ball 23, as shown, is supported at opposite points. The lower member 21 is provided with a stem 24 which passes through a bearing 25 carried by the frame and bears upon the edge of a cam 26 which is fixed to the shaft 17. The upper member 22 is equipped with a stem 27 which is in vertical alinement with the stem 24 of the lower member, and is threaded into a piston 28 which works in an air cylinder 29 carried by the frame. A pipe 30 supplies compressed air to the cylinder on top of the piston, the air pressure within the cylinder being controlled by a valve 31 in the pipe.

The stem 27 of the upper member 22 is provided with a spool 32 upon which is wound a cord 33, the cord being trained over pulleys 34 and 35 supported upon the post 15, and being terminally equipped with a weight 36 which tends to unwind the cord off the spool with resultant rotation of the stem 27 to advance the threaded stem out of its socket in the piston to take up permanent set in the rubber ball as will presently appear.

In operation, the ball of stock to be tested is placed between the members 21 and 22, these members being initially positioned so that the stem of the lower member bears upon the low side of the cam 26, and the member 22 touches the ball without compressing it. Air under any desired pressure is now let into the cylinder. The machine is then started whereupon the cam alternately raises and permits gravitation of the member 21 so that the rubber ball is alternately compressed against the member 22 and permitted to expand to normal condition, whereby internal heat condition, disintegration, etc., will be set up in the material similar to that produced in actual service.

By varying the air pressure in the cylinder, any desired load may be placed upon the ball while it is being compressed. For instance, suppose that it is desired to compress the ball under a pressure of 250 pounds. If the piston area is 10 square inches, then 25 pounds air pressure must be let into the cylinder. When the ball is compressed as much as possible under this pressure of 250 pounds, the piston will recede the amount of the balance of the stroke of the member 21, so that a pressure of 250 pounds on the ball is not exceeded at any moment of the compression stroke of the member 21.

As is well known to those working in the art, the ball of rubber stock will not return after compression to its initial thickness, but will settle and fail to return to its initial thickness by a small increment, and this increment is known as the permanent set taken by the material. After each increment settling of the material, the member 22 is unscrewed from the piston 28 by the weight 36 acting upon the cord 33, and is moved downwardly sufficiently to contact with the material. Thus the member 22 is constantly maintained in intimate contact with the material. After the machine has been operating for a desired period, it is stopped and the permanent set taken by the material, under the influence of the known pressure of the members 21 and 22, acting through the known period of time, may be measured by calipers, or otherwise.

Having thus described my invention, what I claim as new and desire to protect by Letters Patent is:

1. A testing machine comprising a pair of pressure applying members, means for relatively moving said members to and from each other for compressing the stock to be tested, fluid operative means for regulating the load applied to the stock by said members, and means for adjusting one of said members to provide for the permanent set of said stock.

2. In a testing machine a pair of pressure applying members, means for relatively moving said members to and from each other for compressing the stock to be tested, and means for automatically adjusting one of said members to provide for the permanent set of said stock.

3. In a testing machine a pair of pressure applying members, means for relatively moving said members to and from each other for compressing the stock to be tested, means for automatically adjusting one of said members to provide for the permanent set of said stock, and a pressure regulating means.

4. A testing machine comprising members adapted to support the material to be tested, means for actuating one of the members to alternately compress and permit expansion of the material, and means for exerting pneumatic pressure on the other member.

5. A testing machine comprising members adapted to support the material to be tested, means for actuating one of the members to alternately compress and permit expansion of the material, means for exerting pneumatic pressure on the other member, and means independent of said pressure means for moving said other member into contact with the material after increment settling of the material.

Signed at New York, New York, this 6th day of June, 1916.

SHELDON P. THACHER.